(No Model.)
P. J. LENNARD.
CASTER.
No. 491,710. Patented Feb. 14, 1893.
Fig. 1.
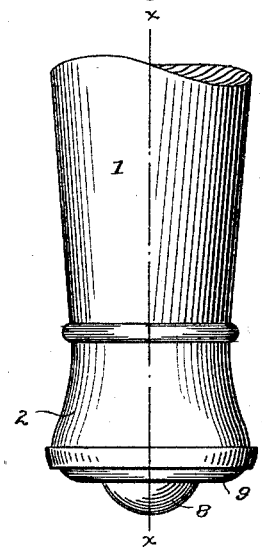
Fig. 2. Fig. 7.
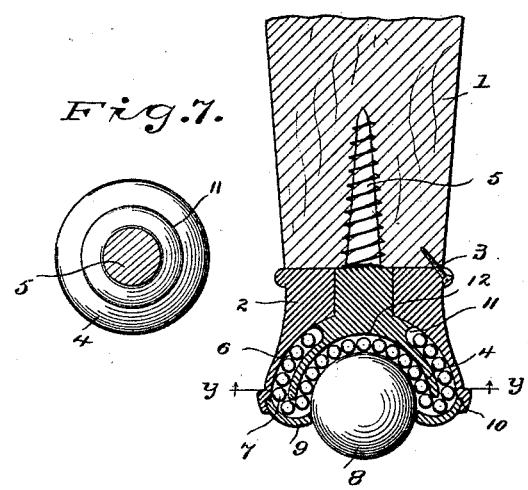
Fig. 6.
Fig. 4.
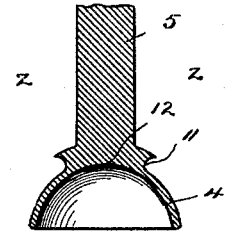
Fig. 3.
Fig. 5.
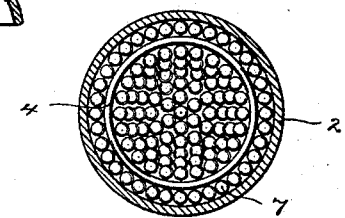
WITNESSES
H. A. Lamb
Mattie R. Davis
INVENTOR
Per J. Lennard
By H. M. Wooster
Atty.

UNITED STATES PATENT OFFICE.

PER J. LENNARD, OF STAMFORD, CONNECTICUT.

CASTER.

SPECIFICATION forming part of Letters Patent No. 491,710, dated February 14, 1893.

Application filed July 7, 1892. Serial No. 439,231. (No model.)

*To all whom it may concern:*

Be it known that I, PER J. LENNARD, a subject of the King of Sweden and Norway, residing at Stamford, in the county of Fairfield and State of Connecticut, have invented certain new and useful Improvements in Casters; and I do hereby declare the following to be a full, clear, and exact description of the invention, such as will enable others skilled in the art to which it appertains to make and use the same.

My invention relates to the construction of ball casters adapted for use upon furniture, safes, trunks, &c., and has for its object to so improve the construction that the friction balls shall be at all times free to roll in any direction, thereby making it practically impossible for the caster ball to become set at any time and leaving it perfectly free at all times to turn in any direction. With these ends in view I have devised the simple and novel construction which I will now describe, referring by numbers to the accompanying drawings forming part of this specification in which, Figure 1 is an elevation of a furniture leg showing the application thereto of my novel caster, Fig. 2 a section on the line *xx* in Fig. 1, Fig. 3 a section on the line *yy* in Fig. 2 looking up, Fig. 4 a section of the casing detached, Fig. 5 a section of the holding ring detached, Fig. 6 a section of the shank and cup detached, and Fig. 7 is a top plan view of the shank and cup detached.

1 denotes an object, as for example a table leg, to which the caster is attached.

2 denotes the casing which is held in place by screws 3 or in any suitable manner, and 4 denotes a cup which is formed integral with a shank 5 which may or may not be screw threaded as shown in Fig. 2, this depending upon the manner in which the caster is put together and secured in place. The inner side of the casing and the outer side of the cup are so formed as to leave a recess 6 between the lower portion of the cup and the casing. This recess as well as the cup is entirely filled with friction balls denoted by 7.

8 denotes the caster ball which rests upon the friction balls in the cup and is held in place by a holding ring 9. In the drawings I have shown this holding ring as made separate from the casing, the upper edge of the ring resting against a shoulder 10 in the casing, and the lower edge of the casing being curved inward over the upper edge of the ring to hold it in place as is clearly shown in Fig. 2. If preferred however, the holding ring and the casing may be formed in a single piece and the lower edge thereof turned inward by a tool to hold the caster ball and friction balls in place. This being a well known construction is not deemed to require illustration. It should be noted, see Fig. 2, that there is ample space between the lower end of the cup and the holding ring for the anti-friction balls to pass. This is the specially important feature of my invention, as it insures that there shall be no locking of the caster ball or friction balls under any circumstances, the friction balls being free to change position constantly, passing into and out of the cup by rolling over the edge of the cup. Heretofore the friction balls in this class of casters have been brought to a stop by coming in contact with the holding device, there being no way for them to continue moving. This objection is wholly overcome in my novel caster, in which there is not only no obstruction in the cup to the free movement of the balls but the top of the cup is slightly recessed out as at 12 see Figs. 2 and 6, so that the balls at the top of the cup do not bear thereon at all, the entire bearing of the friction balls upon the cup being below the top thereof. The balls pass out of the cup, passing over the lower edge thereof and into the recess freely in any direction, their place in the cup being taken by balls which pass into the cup from the recess on the side opposite to that from which they are passing out. It should be noted that the cup is absolutely free from obstruction to the movement of the friction balls and that the recess is practically so, the balls passing freely around the portion of the shank which forms the upper end of the recess as at 11, see Figs. 2 and 7. It is obvious that the upper end of this recess would serve as a stop for the balls as in ordinary casters of this class, were it not that the position of the friction balls in the recess is continually changing when the article is moved, owing to the constant passage of balls into and out of the recess and cup, said balls passing over the lower edge of the cup. This constant change of the position of the balls in the recess permits the balls to slide freely around the portion of the shank forming the upper end of the recess when they come in contact therewith.

Having thus described my invention I claim—

A caster consisting essentially of a casing, a cup within the casing having a recess 12 at the top, said cup and casing being so formed as to leave a recess between said parts, friction balls in said cup and recess, a caster ball resting on the friction balls in the cup, and a suitable holding ring by which the caster ball and friction balls are held in place, sufficient space being left between the lower end of the cup and the holding ring to permit the friction balls to pass freely into and out of the cup and recess, and the bearing of the friction balls on the cup being entirely on the side below the top thereof.

In testimony whereof I affix my signature in presence of two witnesses.

PER J. LENNARD.

Witnesses:
A. M. WOOSTER,
PEARL M. REYNOLDS.